*US008989103B2*

United States Patent
Jeffery et al.

(10) Patent No.: US 8,989,103 B2
(45) Date of Patent: Mar. 24, 2015

(54) METHOD AND SYSTEM FOR SELECTIVE ATTENUATION OF PREAMBLE RECEPTION IN CO-LOCATED WI FI ACCESS POINTS

(71) Applicant: Magnolia Broadband Inc., Englewood, NJ (US)

(72) Inventors: Stuart S. Jeffery, Los Altos, CA (US); Kenneth Kludt, San Jose, CA (US); Haim Harel, New York, NY (US)

(73) Assignee: Magnolia Broadband Inc., Englewood, NJ (US)

( * ) Notice: Subject to any disclaimer, the term of this patent is extended or adjusted under 35 U.S.C. 154(b) by 0 days.

(21) Appl. No.: 14/198,280

(22) Filed: Mar. 5, 2014

(65) Prior Publication Data

US 2014/0247820 A1    Sep. 4, 2014

Related U.S. Application Data

(63) Continuation-in-part of application No. 13/858,302, filed on Apr. 8, 2013, and a continuation-in-part of application No. 13/925,454, filed on Jun. 24, 2013.

(60) Provisional application No. 61/764,209, filed on Feb. 13, 2013, provisional application No. 61/805,770, filed on Mar. 27, 2013.

(51) Int. Cl.
*H04W 4/00* (2009.01)
*H04B 1/00* (2006.01)
(Continued)

(52) U.S. Cl.
CPC ............. *H04W 16/14* (2013.01); *H04B 7/0417* (2013.01); *H04B 7/0413* (2013.01)
USPC .......................................... 370/328; 455/63.1

(58) Field of Classification Search
CPC ....... H04W 16/28; H04W 72/082; H04L 1/00
USPC ............................. 370/338; 455/63.1, 562.1
See application file for complete search history.

(56) References Cited

U.S. PATENT DOCUMENTS

| | | | |
|---|---|---|---|
| 4,044,359 | A | 8/1977 | Applebaum et al. |
| 4,079,318 | A | 3/1978 | Kinoshita |

(Continued)

FOREIGN PATENT DOCUMENTS

| | | |
|---|---|---|
| EP | 1 867 177 | 5/2010 |
| EP | 2 234 355 | 9/2010 |

(Continued)

OTHER PUBLICATIONS

Office Action issued by the United States Patent and Trademark Office for U.S. Appl. No. 13/630,146 dated Jan. 22, 2013.

(Continued)

*Primary Examiner* — Dang Ton
*Assistant Examiner* — Ryan Kavleski
(74) *Attorney, Agent, or Firm* — Pearl Cohen Zedek Latzer Baratz LLP

(57) ABSTRACT

A method and system for attenuating a received preamble in an IEEE 802.11 standard may include: a plurality of co-located access points (APs) operative in accordance with an IEEE 802.11 standard; a preamble detection unit configured to detect a transmission of a preamble in accordance of the IEEE 802.11 standard, by at least one of the co-located APs; and at least one attenuator configured to attenuate a signal received by at least one of the plurality of co-located APs upon detection of the preamble by the preamble detection unit.

16 Claims, 8 Drawing Sheets

(51) Int. Cl.
*H04W 16/14* (2009.01)
*H04B 7/04* (2006.01)

(56) References Cited

U.S. PATENT DOCUMENTS

| | | | |
|---|---|---|---|
| 4,359,738 A | 11/1982 | Lewis | |
| 4,540,985 A | 9/1985 | Clancy et al. | |
| 4,628,320 A | 12/1986 | Downie | |
| 5,162,805 A | 11/1992 | Cantrell | |
| 5,363,104 A | 11/1994 | Richmond | |
| 5,444,762 A | 8/1995 | Frey et al. | |
| 5,732,075 A | 3/1998 | Tangemann et al. | |
| 5,915,215 A | 6/1999 | Williams et al. | |
| 5,936,577 A | 8/1999 | Shoki et al. | |
| 5,940,033 A | 8/1999 | Locher et al. | |
| 6,018,317 A | 1/2000 | Dogan et al. | |
| 6,026,081 A | 2/2000 | Hamabe | |
| 6,046,655 A | 4/2000 | Cipolla | |
| 6,101,399 A | 8/2000 | Raleigh et al. | |
| 6,163,695 A | 12/2000 | Takemura | |
| 6,167,286 A | 12/2000 | Ward et al. | |
| 6,215,812 B1 | 4/2001 | Young et al. | |
| 6,226,507 B1 | 5/2001 | Ramesh et al. | |
| 6,230,123 B1 | 5/2001 | Mekuria et al. | |
| 6,259,683 B1 | 7/2001 | Sekine et al. | |
| 6,297,772 B1 | 10/2001 | Lewis | |
| 6,321,077 B1 | 11/2001 | Saitoh et al. | |
| 6,335,953 B1 * | 1/2002 | Sanderford et al. | 375/344 |
| 6,370,378 B1 | 4/2002 | Yahagi | |
| 6,377,783 B1 | 4/2002 | Lo et al. | |
| 6,393,282 B1 | 5/2002 | Iimori | |
| 6,584,115 B1 | 6/2003 | Suzuki | |
| 6,697,622 B1 | 2/2004 | Ishikawa et al. | |
| 6,697,633 B1 | 2/2004 | Dogan et al. | |
| 6,834,073 B1 | 12/2004 | Miller et al. | |
| 6,842,460 B1 | 1/2005 | Olkkonen et al. | |
| 6,914,890 B1 | 7/2005 | Tobita et al. | |
| 6,927,646 B2 | 8/2005 | Niemi | |
| 6,975,582 B1 | 12/2005 | Karabinis et al. | |
| 6,987,958 B1 | 1/2006 | Lo et al. | |
| 7,068,628 B2 | 6/2006 | Li et al. | |
| 7,177,663 B2 | 2/2007 | Axness et al. | |
| 7,190,964 B2 | 3/2007 | Damnjanovic et al. | |
| 7,257,425 B2 | 8/2007 | Wang et al. | |
| 7,299,072 B2 | 11/2007 | Ninomiya | |
| 7,391,757 B2 | 6/2008 | Haddad et al. | |
| 7,392,015 B1 | 6/2008 | Farlow et al. | |
| 7,474,676 B2 | 1/2009 | Tao et al. | |
| 7,499,109 B2 | 3/2009 | Kim et al. | |
| 7,512,083 B2 | 3/2009 | Li | |
| 7,606,528 B2 | 10/2009 | Mesecher | |
| 7,634,015 B2 | 12/2009 | Waxman | |
| 7,646,744 B2 | 1/2010 | Li | |
| 7,719,993 B2 | 5/2010 | Li et al. | |
| 7,742,000 B2 | 6/2010 | Mohamadi | |
| 7,769,107 B2 | 8/2010 | Sandhu et al. | |
| 7,898,478 B2 | 3/2011 | Niu et al. | |
| 7,904,086 B2 | 3/2011 | Kundu et al. | |
| 7,933,255 B2 | 4/2011 | Li | |
| 7,970,366 B2 | 6/2011 | Arita et al. | |
| 8,078,109 B1 | 12/2011 | Mulcay | |
| 8,103,284 B2 | 1/2012 | Mueckenheim et al. | |
| 8,115,679 B2 | 2/2012 | Falk | |
| 8,155,613 B2 | 4/2012 | Kent et al. | |
| 8,275,377 B2 | 9/2012 | Nanda et al. | |
| 8,280,443 B2 | 10/2012 | Tao et al. | |
| 8,294,625 B2 | 10/2012 | Kittinger et al. | |
| 8,306,012 B2 | 11/2012 | Lindoff et al. | |
| 8,315,671 B2 | 11/2012 | Kuwahara et al. | |
| 8,369,436 B2 | 2/2013 | Stirling-Gallacher | |
| 8,509,190 B2 | 8/2013 | Rofougaran | |
| 8,520,657 B2 | 8/2013 | Rofougaran | |
| 8,526,886 B2 | 9/2013 | Wu et al. | |
| 8,588,844 B2 | 11/2013 | Shpak | |
| 8,599,955 B1 | 12/2013 | Kludt et al. | |
| 8,599,979 B2 | 12/2013 | Farag et al. | |
| 8,611,288 B1 | 12/2013 | Zhang et al. | |
| 8,644,413 B2 | 2/2014 | Harel et al. | |
| 8,649,458 B2 | 2/2014 | Kludt et al. | |
| 8,666,319 B2 | 3/2014 | Kloper et al. | |
| 8,744,511 B2 | 6/2014 | Jones et al. | |
| 8,767,862 B2 | 7/2014 | Abreu et al. | |
| 8,780,743 B2 | 7/2014 | Sombrutzki et al. | |
| 2001/0029326 A1 | 10/2001 | Diab et al. | |
| 2001/0038665 A1 | 11/2001 | Baltersee et al. | |
| 2002/0024975 A1 | 2/2002 | Hendler | |
| 2002/0051430 A1 | 5/2002 | Kasami et al. | |
| 2002/0065107 A1 | 5/2002 | Harel et al. | |
| 2002/0085643 A1 | 7/2002 | Kitchener et al. | |
| 2002/0107013 A1 | 8/2002 | Fitzgerald | |
| 2002/0115474 A1 | 8/2002 | Yoshino et al. | |
| 2002/0181426 A1 | 12/2002 | Sherman | |
| 2002/0181437 A1 | 12/2002 | Ohkubo et al. | |
| 2003/0087645 A1 | 5/2003 | Kim et al. | |
| 2003/0114162 A1 | 6/2003 | Chheda et al. | |
| 2003/0153322 A1 | 8/2003 | Burke et al. | |
| 2003/0153360 A1 | 8/2003 | Burke et al. | |
| 2003/0186653 A1 | 10/2003 | Mohebbi et al. | |
| 2003/0203717 A1 | 10/2003 | Chuprun et al. | |
| 2003/0203743 A1 | 10/2003 | Sugar et al. | |
| 2004/0023693 A1 | 2/2004 | Okawa et al. | |
| 2004/0056795 A1 | 3/2004 | Ericson et al. | |
| 2004/0063455 A1 | 4/2004 | Eran et al. | |
| 2004/0081144 A1 * | 4/2004 | Martin et al. | 370/360 |
| 2004/0121810 A1 | 6/2004 | Goransson et al. | |
| 2004/0125899 A1 | 7/2004 | Li et al. | |
| 2004/0125900 A1 | 7/2004 | Liu et al. | |
| 2004/0142696 A1 * | 7/2004 | Saunders et al. | 455/450 |
| 2004/0147266 A1 | 7/2004 | Hwang et al. | |
| 2004/0156399 A1 | 8/2004 | Eran | |
| 2004/0166902 A1 | 8/2004 | Castellano et al. | |
| 2004/0198292 A1 | 10/2004 | Smith et al. | |
| 2004/0228388 A1 | 11/2004 | Salmenkaita | |
| 2004/0235527 A1 | 11/2004 | Reudink et al. | |
| 2004/0264504 A1 | 12/2004 | Jin | |
| 2005/0068230 A1 | 3/2005 | Munoz et al. | |
| 2005/0068918 A1 | 3/2005 | Mantravadi et al. | |
| 2005/0075140 A1 | 4/2005 | Famolari | |
| 2005/0129155 A1 | 6/2005 | Hoshino | |
| 2005/0147023 A1 | 7/2005 | Stephens et al. | |
| 2005/0163097 A1 | 7/2005 | Do et al. | |
| 2005/0245224 A1 | 11/2005 | Kurioka | |
| 2005/0250544 A1 | 11/2005 | Grant et al. | |
| 2005/0254513 A1 | 11/2005 | Cave et al. | |
| 2005/0265436 A1 | 12/2005 | Suh et al. | |
| 2005/0286440 A1 | 12/2005 | Strutt et al. | |
| 2005/0287962 A1 | 12/2005 | Mehta et al. | |
| 2006/0041676 A1 | 2/2006 | Sherman | |
| 2006/0092889 A1 | 5/2006 | Lyons et al. | |
| 2006/0094372 A1 | 5/2006 | Ahn et al. | |
| 2006/0098605 A1 | 5/2006 | Li | |
| 2006/0111149 A1 | 5/2006 | Chitrapu et al. | |
| 2006/0135097 A1 | 6/2006 | Wang et al. | |
| 2006/0183503 A1 | 8/2006 | Goldberg | |
| 2006/0203850 A1 | 9/2006 | Johnson et al. | |
| 2006/0227854 A1 | 10/2006 | McCloud et al. | |
| 2006/0264184 A1 | 11/2006 | Li et al. | |
| 2006/0270343 A1 | 11/2006 | Cha et al. | |
| 2006/0271969 A1 | 11/2006 | Takizawa et al. | |
| 2006/0285507 A1 | 12/2006 | Kinder et al. | |
| 2007/0041398 A1 | 2/2007 | Benveniste | |
| 2007/0058581 A1 | 3/2007 | Benveniste | |
| 2007/0076675 A1 | 4/2007 | Chen | |
| 2007/0093261 A1 | 4/2007 | Hou et al. | |
| 2007/0097918 A1 | 5/2007 | Cai et al. | |
| 2007/0115882 A1 | 5/2007 | Wentink | |
| 2007/0115914 A1 | 5/2007 | Ohkubo et al. | |
| 2007/0152903 A1 | 7/2007 | Lin et al. | |
| 2007/0217352 A1 | 9/2007 | Kwon | |
| 2007/0223380 A1 | 9/2007 | Gilbert et al. | |
| 2007/0249386 A1 | 10/2007 | Bennett | |
| 2008/0043867 A1 | 2/2008 | Blanz et al. | |
| 2008/0051037 A1 | 2/2008 | Molnar et al. | |
| 2008/0081671 A1 | 4/2008 | Wang et al. | |

(56) References Cited

U.S. PATENT DOCUMENTS

| | | |
|---|---|---|
| 2008/0095163 A1 | 4/2008 | Chen et al. |
| 2008/0108352 A1 | 5/2008 | Montemurro et al. |
| 2008/0144737 A1 | 6/2008 | Naguib |
| 2008/0165732 A1 | 7/2008 | Kim et al. |
| 2008/0238808 A1 | 10/2008 | Arita et al. |
| 2008/0240314 A1 | 10/2008 | Gaal et al. |
| 2008/0267142 A1 | 10/2008 | Mushkin et al. |
| 2008/0280571 A1 | 11/2008 | Rofougaran et al. |
| 2008/0285637 A1 | 11/2008 | Liu et al. |
| 2009/0003299 A1 | 1/2009 | Cave et al. |
| 2009/0028225 A1 | 1/2009 | Runyon et al. |
| 2009/0046638 A1 | 2/2009 | Rappaport et al. |
| 2009/0058724 A1 | 3/2009 | Xia et al. |
| 2009/0121935 A1 | 5/2009 | Xia et al. |
| 2009/0137206 A1 | 5/2009 | Sherman et al. |
| 2009/0154419 A1 | 6/2009 | Yoshida et al. |
| 2009/0187661 A1 | 7/2009 | Sherman |
| 2009/0190541 A1 | 7/2009 | Abedi |
| 2009/0227255 A1 | 9/2009 | Thakare |
| 2009/0239486 A1 | 9/2009 | Sugar et al. |
| 2009/0268616 A1 | 10/2009 | Hosomi |
| 2009/0285331 A1 | 11/2009 | Sugar et al. |
| 2009/0322610 A1 | 12/2009 | Hants et al. |
| 2009/0322613 A1 | 12/2009 | Bala et al. |
| 2009/0323608 A1 | 12/2009 | Adachi et al. |
| 2010/0002656 A1 | 1/2010 | Ji et al. |
| 2010/0037111 A1 | 2/2010 | Ziaja et al. |
| 2010/0040369 A1 | 2/2010 | Zhao et al. |
| 2010/0067473 A1 | 3/2010 | Cave et al. |
| 2010/0111039 A1 | 5/2010 | Kim et al. |
| 2010/0117890 A1 | 5/2010 | Vook et al. |
| 2010/0135420 A1 | 6/2010 | Xu et al. |
| 2010/0150013 A1 | 6/2010 | Hara et al. |
| 2010/0172429 A1 | 7/2010 | Nagahama et al. |
| 2010/0195560 A1 | 8/2010 | Nozaki et al. |
| 2010/0195601 A1 | 8/2010 | Zhang |
| 2010/0208712 A1 | 8/2010 | Wax et al. |
| 2010/0222011 A1* | 9/2010 | Behzad ............ 455/77 |
| 2010/0232355 A1 | 9/2010 | Richeson et al. |
| 2010/0234071 A1 | 9/2010 | Shabtay et al. |
| 2010/0278063 A1 | 11/2010 | Kim et al. |
| 2010/0283692 A1 | 11/2010 | Achour et al. |
| 2010/0285752 A1 | 11/2010 | Lakshmanan et al. |
| 2010/0291931 A1 | 11/2010 | Suemitsu et al. |
| 2010/0303170 A1 | 12/2010 | Zhu et al. |
| 2010/0316043 A1 | 12/2010 | Doi et al. |
| 2011/0019639 A1 | 1/2011 | Karaoguz et al. |
| 2011/0032849 A1 | 2/2011 | Yeung et al. |
| 2011/0032972 A1 | 2/2011 | Wang et al. |
| 2011/0085465 A1 | 4/2011 | Lindoff et al. |
| 2011/0085532 A1 | 4/2011 | Scherzer et al. |
| 2011/0105036 A1 | 5/2011 | Rao et al. |
| 2011/0116489 A1 | 5/2011 | Grandhi |
| 2011/0134816 A1 | 6/2011 | Liu et al. |
| 2011/0150050 A1 | 6/2011 | Trigui et al. |
| 2011/0150066 A1 | 6/2011 | Fujimoto |
| 2011/0151826 A1 | 6/2011 | Miller et al. |
| 2011/0163913 A1 | 7/2011 | Cohen et al. |
| 2011/0205883 A1 | 8/2011 | Mihota |
| 2011/0205998 A1 | 8/2011 | Hart et al. |
| 2011/0228742 A1 | 9/2011 | Honkasalo et al. |
| 2011/0249576 A1 | 10/2011 | Chrisikos et al. |
| 2011/0250884 A1 | 10/2011 | Brunel et al. |
| 2011/0273977 A1 | 11/2011 | Shapira et al. |
| 2011/0281541 A1 | 11/2011 | Borremans |
| 2011/0299437 A1 | 12/2011 | Mikhemar et al. |
| 2011/0310827 A1 | 12/2011 | Srinivasa et al. |
| 2011/0310853 A1 | 12/2011 | Yin et al. |
| 2012/0014377 A1 | 1/2012 | Joergensen et al. |
| 2012/0015603 A1 | 1/2012 | Proctor et al. |
| 2012/0020396 A1 | 1/2012 | Hohne et al. |
| 2012/0027000 A1 | 2/2012 | Wentink |
| 2012/0028638 A1 | 2/2012 | Mueck et al. |
| 2012/0028655 A1 | 2/2012 | Mueck et al. |
| 2012/0028671 A1 | 2/2012 | Niu et al. |
| 2012/0033761 A1 | 2/2012 | Guo et al. |
| 2012/0034952 A1 | 2/2012 | Lo et al. |
| 2012/0045003 A1 | 2/2012 | Li et al. |
| 2012/0051287 A1 | 3/2012 | Merlin et al. |
| 2012/0064838 A1 | 3/2012 | Miao et al. |
| 2012/0069828 A1 | 3/2012 | Taki et al. |
| 2012/0076028 A1 | 3/2012 | Ko et al. |
| 2012/0076229 A1 | 3/2012 | Brobston et al. |
| 2012/0088512 A1 | 4/2012 | Yamada et al. |
| 2012/0092217 A1 | 4/2012 | Hosoya et al. |
| 2012/0100802 A1 | 4/2012 | Mohebbi |
| 2012/0115523 A1 | 5/2012 | Shpak |
| 2012/0155349 A1 | 6/2012 | Bajic et al. |
| 2012/0155397 A1 | 6/2012 | Shaffer et al. |
| 2012/0163257 A1 | 6/2012 | Kim et al. |
| 2012/0163302 A1 | 6/2012 | Takano |
| 2012/0170453 A1 | 7/2012 | Tiwari |
| 2012/0170672 A1 | 7/2012 | Sondur |
| 2012/0201153 A1 | 8/2012 | Bharadia et al. |
| 2012/0201173 A1 | 8/2012 | Jain et al. |
| 2012/0207256 A1 | 8/2012 | Farag et al. |
| 2012/0212372 A1 | 8/2012 | Petersson et al. |
| 2012/0213065 A1 | 8/2012 | Koo et al. |
| 2012/0218962 A1 | 8/2012 | Kishiyama et al. |
| 2012/0220331 A1 | 8/2012 | Luo et al. |
| 2012/0230380 A1 | 9/2012 | Keusgen et al. |
| 2012/0251031 A1 | 10/2012 | Suarez et al. |
| 2012/0270531 A1 | 10/2012 | Wright et al. |
| 2012/0270544 A1 | 10/2012 | Shah |
| 2012/0281598 A1 | 11/2012 | Struhsaker et al. |
| 2012/0314570 A1 | 12/2012 | Forenza et al. |
| 2012/0321015 A1 | 12/2012 | Hansen et al. |
| 2012/0327870 A1 | 12/2012 | Grandhi et al. |
| 2013/0010623 A1 | 1/2013 | Golitschek |
| 2013/0017794 A1 | 1/2013 | Kloper et al. |
| 2013/0023225 A1 | 1/2013 | Weber |
| 2013/0044877 A1 | 2/2013 | Liu et al. |
| 2013/0051283 A1 | 2/2013 | Lee et al. |
| 2013/0058239 A1 | 3/2013 | Wang et al. |
| 2013/0070741 A1 | 3/2013 | Li et al. |
| 2013/0079048 A1 | 3/2013 | Cai et al. |
| 2013/0094437 A1 | 4/2013 | Bhattacharya |
| 2013/0094621 A1 | 4/2013 | Luo et al. |
| 2013/0095780 A1* | 4/2013 | Prazan et al. ............ 455/234.1 |
| 2013/0101073 A1 | 4/2013 | Zai et al. |
| 2013/0150012 A1 | 6/2013 | Chhabra et al. |
| 2013/0156016 A1 | 6/2013 | Debnath et al. |
| 2013/0156120 A1 | 6/2013 | Josiam et al. |
| 2013/0170388 A1 | 7/2013 | Ito et al. |
| 2013/0190006 A1 | 7/2013 | Kazmi et al. |
| 2013/0208587 A1 | 8/2013 | Bala et al. |
| 2013/0208619 A1 | 8/2013 | Kudo et al. |
| 2013/0223400 A1 | 8/2013 | Seo et al. |
| 2013/0229996 A1 | 9/2013 | Wang et al. |
| 2013/0229999 A1 | 9/2013 | Da Silva et al. |
| 2013/0235720 A1 | 9/2013 | Wang et al. |
| 2013/0242853 A1 | 9/2013 | Seo et al. |
| 2013/0242899 A1 | 9/2013 | Lysejko et al. |
| 2013/0242965 A1 | 9/2013 | Horn et al. |
| 2013/0242976 A1 | 9/2013 | Katayama et al. |
| 2013/0252621 A1 | 9/2013 | Dimou et al. |
| 2013/0272437 A1 | 10/2013 | Eidson et al. |
| 2013/0301551 A1 | 11/2013 | Ghosh et al. |
| 2013/0331136 A1 | 12/2013 | Yang et al. |
| 2013/0343369 A1 | 12/2013 | Yamaura |
| 2014/0010089 A1 | 1/2014 | Cai et al. |
| 2014/0010211 A1 | 1/2014 | Asterjadhi et al. |
| 2014/0029433 A1 | 1/2014 | Wentink |
| 2014/0071873 A1 | 3/2014 | Wang et al. |
| 2014/0086077 A1 | 3/2014 | Safavi |
| 2014/0086081 A1 | 3/2014 | Mack et al. |
| 2014/0098681 A1* | 4/2014 | Stager et al. ............ 370/252 |
| 2014/0119288 A1 | 5/2014 | Zhu et al. |
| 2014/0185501 A1 | 7/2014 | Park et al. |
| 2014/0185535 A1 | 7/2014 | Park et al. |
| 2014/0192820 A1 | 7/2014 | Azizi et al. |
| 2014/0204821 A1 | 7/2014 | Seok et al. |

(56) References Cited

U.S. PATENT DOCUMENTS

2014/0241182 A1 8/2014 Smadi
2014/0307653 A1 10/2014 Liu et al.

FOREIGN PATENT DOCUMENTS

| JP | 2009-278444 | 11/2009 |
|----|----|----|
| WO | WO 03/047033 | 6/2003 |
| WO | WO 03/073645 | 9/2003 |
| WO | WO 2010/085854 | 8/2010 |
| WO | WO 2011/060058 | 5/2011 |

OTHER PUBLICATIONS

Office Action issued by the United States Patent and Trademark Office for U.S. Appl. No. 13/630,146 dated Mar. 27, 2013.
Office Action issued by the United States Patent and Trademark Office for U.S. Appl. No. 13/762,159 dated Apr. 16, 2013.
Office Action issued by the United States Patent and Trademark Office for U.S. Appl. No. 13/762,191 dated May 2, 2013.
Office Action issued by the United States Patent and Trademark Office for U.S. Appl. No. 13/762,188 dated May 15, 2013.
Office Action issued by the United States Patent and Trademark Office for U.S. Appl. No. 13/776,204 dated May 21, 2013.
Office Action issued by the United States Patent and Trademark Office for U.S. Appl. No. 13/770,255 dated Jun. 6, 2013.
Office Action issued by the United States Patent and Trademark Office for U.S. Appl. No. 13/776,068 dated Jun. 11, 2013.
Notice of Allowance issued by the United States Patent and Trademark Office for U.S. Appl. No. 13/762,159 dated Jun. 20, 2013.
Office Action issued by the United States Patent and Trademark Office for U.S. Appl. No. 13/775,886 dated Jul. 17, 2013.
Notice of Allowance issued by the United States Patent and Trademark Office for U.S. Appl. No. 13/762,191 dated Jul. 19, 2013.
Notice of Allowance issued by the United States Patent and Trademark Office for U.S. Appl. No. 13/630,146 dated Jul. 31, 2013.
Notice of Allowance issued by the United States Patent and Trademark Office for U.S. Appl. No. 13/762,188 dated Aug. 19, 2013.
Notice of Allowance issued by the United States Patent and Trademark Office for U.S. Appl. No. 13/770,255 dated Sep. 17, 2013.
Ahmadi-Shokouh et al., "Pre-LNA Smart Soft Antenna Selection for MIMO Spatial Multiplexing/Diversity System when Amplifier/Sky Noise Dominates", European Transactions on Telecommunications, Wiley & Sons, Chichester, GB, vol. 21, No. 7, Nov. 1, 2010, pp. 663-677.
Office Action issued by the United States Patent and Trademark Office for U.S. Appl. No. 13/889,150 dated Sep. 25, 2013.
Office Action issued by the United States Patent and Trademark Office for U.S. Appl. No. 13/955,320 dated Oct. 15, 2013.
Office Action issued by the United States Patent and Trademark Office for U.S. Appl. No. 13/776,204 dated Oct. 23, 2013.
Office Action issued by the United States Patent and Trademark Office for U.S. Appl. No. 13/925,454 dated Oct. 28, 2013.
Office Action issued by the United States Patent and Trademark Office for U.S. Appl. No. 13/955,194 dated Oct. 30, 2013.
Office Action issued by the United States Patent and Trademark Office for U.S. Appl. No. 14/013,190 dated Nov. 5, 2013.
Office Action issued by the United States Patent and Trademark Office for U.S. Appl. No. 13/776,068 dated Nov. 5, 2013.
Office Action issued by the United States Patent and Trademark Office for U.S. Appl. No. 14/010,771 dated Dec. 17, 2013.
Office Action issued by the United States Patent and Trademark Office for U.S. Appl. No. 14/065,182 dated Dec. 17, 2013.
Office Action issued by the United States Patent and Trademark Office for U.S. Appl. No. 14/068,863 dated Dec. 17, 2013.
Office Action issued by the United States Patent and Trademark Office for U.S. Appl. No. 14/011,521 dated Dec. 23, 2013.
Office Action issued by the United States Patent and Trademark Office for U.S. Appl. No. 13/775,886 dated Jan. 7, 2014.
Office Action issued by the United States Patent and Trademark Office for U.S. Appl. No. 14/018,965 dated Jan. 13, 2014.
Office Action issued by the United States Patent and Trademark Office for U.S. Appl. No. 13/858,302 dated Jan. 16, 2014.
Office Action issued by the United States Patent and Trademark Office for U.S. Appl. No. 14/042,020 dated Jan. 16, 2014.
Office Action issued by the United States Patent and Trademark Office for U.S. Appl. No. 14/102,539 dated Jan. 27, 2014.
Office Action issued by the United States Patent and Trademark Office for U.S. Appl. No. 14/087,376 dated Jan. 29, 2014.
Notice of Allowance issued by the United States Patent and Trademark Office for U.S. Appl. No. 13/776,204 dated Jan. 31, 2014.
Office Action issued by the United States Patent and Trademark Office for U.S. Appl. No. 14/094,644 dated Feb. 6, 2014.
Notice of Allowance issued by the United States Patent and Trademark Office for U.S. Appl. No. 13/955,320 dated Feb. 21, 2014.
Huang et al., "Antenna Mismatch and Calibration Problem in Coordinated Multi-point Transmission System," IET Communications, 2012, vol. 6, Issue 3, pp. 289-299.
Office Action issued by the United States Patent and Trademark Office for U.S. Appl. No. 14/109,904 dated Feb. 27, 2014.
Office Action issued by the United States Patent and Trademark Office for U.S. Appl. No. 13/925,454 dated Mar. 7, 2014.
Notice of Allowance issued by the United States Patent and Trademark Office for U.S. Appl. No. 14/172,500 dated Mar. 26, 2014.
Notice of Allowance issued by the United States Patent and Trademark Office for U.S. Appl. No. 14/065,182 dated Mar. 25, 2014.
Notice of Allowance issued by the United States Patent and Trademark Office for U.S. Appl. No. 14/068,863 dated Mar. 25, 2014.
Office Action issued by the United States Patent and Trademark Office for U.S. Appl. No. 14/010,771 dated Apr. 4, 2014.
Office Action issued by the United States Patent and Trademark Office for U.S. Appl. No. 14/085,352 dated Apr. 7, 2014.
Office Action issued by the United States Patent and Trademark Office for U.S. Appl. No. 13/889,150 dated Apr. 9, 2014.
Notice of Allowance issued by the United States Patent and Trademark Office for U.S. Appl. No. 13/955,194 dated Apr. 9, 2014.
Office Action issued by the United States Patent and Trademark Office for U.S. Appl. No. 14/097,765 dated Apr. 22, 2014.
Notice of Allowance issued by the United States Patent and Trademark Office for U.S. Appl. No. 14/087,376 dated May 9, 2014.
Office Action issued by the United States Patent and Trademark Office for U.S. Appl. No. 14/143,580 dated May 9, 2014.
Notice of Allowance issued by the United States Patent and Trademark Office for U.S. Appl. No. 13/776,068 dated May 13, 2014.
Office Action issued by the United States Patent and Trademark Office for U.S. Appl. No. 14/013,190 dated May 20, 2014.
Office Action issued by the United States Patent and Trademark Office for U.S. Appl. No. 14/085,252 dated Jun. 18, 2014.
Office Action issued by the United States Patent and Trademark Office for U.S. Appl. No. 14/094,644 dated Jun. 24, 2014.
Notice of Allowance issued by the United States Patent and Trademark Office for U.S. Appl. No. 14/102,539 dated Jun. 24, 2014.
Office Action issued by the United States Patent and Trademark Office for U.S. Appl. No. 14/011,521 dated Jul. 1, 2014.
Notice of Allowance issued by the United States Patent and Trademark Office for U.S. Appl. No. 14/109,904 dated Jul. 2, 2014.
Notice of Allowance issued by the United States Patent and Trademark Office for U.S. Appl. No. 13/889,150 dated Jul. 8, 2014.
Office Action issued by the United States Patent and Trademark Office for U.S. Appl. No. 14/250,767 dated Jul. 10, 2014.
Notice of Allowance issued by the United States Patent and Trademark Office for U.S. Appl. No. 14/085,352 dated Jul. 23, 2014.
Notice of Allowance issued by the United States Patent and Trademark Office for U.S. Appl. No. 14/013,190 dated Jul. 25, 2014.
Office Action issued by the United States Patent and Trademark Office for U.S. Appl. No. 14/042,020 dated Jul. 31, 2014.
Notice of Allowance issued by the United States Patent and Trademark Office for U.S. Appl. No. 14/010,771 dated Aug. 6, 2014.
Office Action issued by the United States Patent and Trademark Office for U.S. Appl. No. 14/306,458 dated Aug. 13, 2014.
Office Action issued by the United States Patent and Trademark Office for U.S. Appl. No. 14/297,898 dated Aug. 15, 2014.

(56) References Cited

OTHER PUBLICATIONS

Notice of Allowance issued by the United States Patent and Trademark Office for U.S. Appl. No. 14/085,252 dated Aug. 27, 2014.
Office Action issued by the United States Patent and Trademark Office for U.S. Appl. No. 14/181,844 dated Aug. 29, 2014.
Office Action issued by the United States Patent and Trademark Office for U.S. Appl. No. 14/296,209 dated Sep. 4, 2014.
Notice of Allowance issued by the United States Patent and Trademark Office for U.S. Appl. No. 14/097,765 dated Sep. 8, 2014.
Notice of Allowance issued by the United States Patent and Trademark Office for U.S. Appl. No. 14/143,580 dated Sep. 8, 2014.
Office Action issued by the United States Patent and Trademark Office for U.S. Appl. No. 14/198,155 dated Sep. 12, 2014.
Office Action issued by the United States Patent and Trademark Office for U.S. Appl. No. 14/173,640 dated Oct. 6, 2014.
Office Action issued by the United States Patent and Trademark Office for U.S. Appl. No. 14/449,431 dated Oct. 10, 2014.
Office Action issued by the United States Patent and Trademark Office for U.S. Appl. No. 14/171,736 dated Oct. 16, 2014.
Notice of Allowance issued by the United States Patent and Trademark Office for U.S. Appl. No. 14/011,521 dated Oct. 20, 2014.
Office Action issued by the United States Patent and Trademark Office for U.S. Appl. No. 14/320,920 dated Oct. 23, 2014.
Office Action issued by the United States Patent and Trademark Office for U.S. Appl. No. 13/775,886 dated Nov. 17, 2014.
Office Action issued by the United States Patent and Trademark Office for U.S. Appl. No. 14/480,920 dated Nov. 18, 2014.
Office Action issued by the United States Patent and Trademark Office for U.S. Appl. No. 14/481,319 dated Nov. 19, 2014.
Office Action issued by the United States Patent and Trademark Office for U.S. Appl. No. 14/273,866 dated Nov. 28, 2014.
Office Action issued by the United States Patent and Trademark Office for U.S. Appl. No. 14/042,020 dated Dec. 1, 2014.
Office Action issued by the United States Patent and Trademark Office for U.S. Appl. No. 13/888,057 dated Dec. 3, 2014.
Notice of Allowance issued by the United States Patent and Trademark Office for U.S. Appl. No. 14/297,898 dated Dec. 5, 2014.
Notice of Allowance issued by the United States Patent and Trademark Office for U.S. Appl. No. 14/281,358 dated Dec. 16, 2014.
Office Action issued by the United States Patent and Trademark Office for U.S. Appl. No. 14/250,767 dated Dec. 26, 2014.
Notice of Allowance issued by the United States Patent and Trademark U.S. Appl. No. 14/097,765 dated Dec. 31, 2014.
Office Action issued by the United States Patent and Trademark Office for U.S. Appl. No. 14/181,844 dated Jan. 5, 2015.
Office Action issued by the United States Patent and Trademark Office for U.S. Appl. No. 14/306,458 dated Jan. 9, 2015.
Notice of Allowance issued by the United States Patent and Trademark Office for U.S. Appl. No. 14/198,155 dated Jan. 26, 2015.
Notice of Allowance issued by the United States Patent and Trademark Office for U.S. Appl. No. 14/296,209 dated Jan. 27, 2015.
Notice of Allowance issued by the United States Patent and Trademark Office for U.S. Appl. No. 13/925,454 dated Feb. 3, 2015.
Office Action issued by the United States Patent and Trademark Office for U.S. Appl. No. 14/173,640 dated Feb. 3, 2015.

* cited by examiner

| line | Beam B | | Beam D | | | Damage to Beam B Rx during Band D PrambleTx | 707 Noise increase to Beam B Rx during Beam D Tx | Affected Bands |
|---|---|---|---|---|---|---|---|---|
| | Mode | Mod. | Mode | Mod | Blnk Dur (μsec) | | | |
| 701 | AP Tx | - | AP Tx | | | None - not receiving | NA | Both 2.4 and 5 GHz |
| 702 | AP mon | | AP Tx | | | None for UE with SINR > +17 dB. UE below +17 dB SINR will not be detected | +6 db | Both 2.4 and 5 GHz |
| 703 | AP Rx | OFDM | AP Tx | OFDM | 8 | increases SINR for 2 symbols | +6 db | Only 5 GHz |
| 704 | AP Rx | OFDM | AP Tx | DSSS | 64 | increases SINR for 64 symbols | +6 db | Only 2.4 GHz |
| 705 | AP Rx | DSSS | AP Tx | OFDM | 8 | increases SINR for 2 symbols | +6 db | Only 2.4 GHz |
| 706 | AP Rx | DSSS | AP Tx | DSSS | 64 | increases SINR for 64 symbols | +6 db | Only 2.4 GHz |

METHOD AND SYSTEM FOR SELECTIVE ATTENUATION OF PREAMBLE RECEPTION IN CO-LOCATED WI FI ACCESS POINTS

CROSS-REFERENCE TO RELATED APPLICATIONS

This application is a continuation-in-part application of U.S. patent application Ser. No. 13/858,302 filed on Apr. 8, 2013, which claims benefit of U.S. Provisional Patent Application No. 61/764,209 filed on Feb. 13, 2013; this application is a continuation-in-part application of U.S. patent application Ser. No. 13/925,454 filed on Jun. 24, 2013, which claims benefit of U.S. Provisional Patent Application No. 61/805,770 filed on Mar. 27, 2013, all of which are incorporated herein by reference in their entirety.

FIELD OF THE INVENTION

The present invention relates generally to the field of wireless communication, and more specifically, beamforming and IEEE 802.11 standards.

BACKGROUND OF THE INVENTION

Prior to setting forth a short discussion of the related art, it may be helpful to set forth definitions of certain terms that will be used hereinafter.

The term "Wi-Fi" as used herein may include any wireless local area network (WLAN) products that are based on the Institute of Electrical and Electronics Engineers' (IEEE) 802.11 standards".

The term "Access Point" or "AP" as used herein is defined as a device that allows wireless devices (known as User Equipment or "UE") to connect to a wired network using Wi-Fi, or related standards. The AP usually connects to a router (via a wired network) as a standalone device, but it can also be an integral component of the router itself.

The term "User Equipment" or "UE" as used herein is defined as any device that has wireless communication capabilities, specifically, the IEEE 802.11 standards. A UE may be for example a smart telephone, a laptop, a tablet or a personal computer (PC).

The term "Station" as used herein is defined in compliance with the IEEE 802.11 standards as any node on the wireless network. Thus, both UEs and APs are considered in this context to be "Stations".

The terms "Distributed Coordination Function" (DCF), "Distributed Interframe Space" (DIFS), and "Short Interframe Space" (SIFS) as used herein are types of InterFrame Spacings as defined in the IEEE 802.11 standards.

The term "MultiBeam Access Point" (MBAP) as used herein is an AP that includes multiple AP operating simultaneously on the same radio channel where directive beams and other technology enable collation of AP.

The term "beamformer" as used herein refers to analog and/or digital circuitry that implements beamforming and includes combiners and phase shifters or delays and in some cases amplifiers and/or attenuators to adjust the weights of signals to or from each antenna in an antenna array. Digital beamformers may be implemented in digital circuitry such as a digital signal processor (DSP), field-programmable gate array (FPGA), microprocessor or the CPU of a computer to set the weights as may be expressed by phases and amplitudes of the above signals. Various techniques are used to implement beamforming, including: Butler matrices, Blass Matrices, and Rotman Lenses. In general, most approaches attempt to provide simultaneous coverage within a sector using multiple beams.

The term "Clear Channel Assessment" (CCA) as used herein refers to the CCA function as defined in the IEEE 802.11 specifications.

The term "Energy Detection" (ED) as used herein refers to the part of the CCA function as defined in the IEEE 802.11 specifications.

The term "Preamble Detection" as used herein refers to the part of the CCA function that detects the preamble as defined in the IEEE 802.11 specifications.

The term "Back Off" (BO) procedure as used herein refers to the Back Off process as defined in the 802.11 specifications.

The term "Base Band Processor" (BBP) as used herein refers to encoding data and decoding data so as to create the required WiFi baseband signal for all versions of the 802.11 protocol(s).

WiFi has been implemented with a limited amount of frequency resources that use collision avoidance techniques to allow multiple user equipment's (UEs) to share the same channel. As the numbers of UEs proliferate, the impact of such a scheme restricts the ability of collocated Wi-Fi access point (AP) to support an ever increasing number of users. Unsynchronized operation between APs means a transmitting AP's signal may interfere with the reception of another AP that uses the same channel unless sufficient isolation (e.g., exceeding 125 dB) is provided between the transmitting and receiving functions.

Some known solutions address the aforementioned problem by using physically separated antenna arrays for transmit and receive and by providing cancellation of each transmitted signal within the receiver processing functions, achieving about 100 dB of isolation, short of what is required.

SUMMARY OF THE INVENTION

Embodiments of the present invention provide a method whereby the adverse effects of this residual interference can be suppressed through a technique of identifying the source as being benign, as related to normal WiFi operation, and thus suppressed.

Embodiments of the present invention provide an apparatus and methods to allow the reuse of frequency resources by implementing AP clusters using multi-beam antennas breaking down a sector area of coverage into smaller subsectors. In order to accomplish this, several limitations of multi-beam antennas may be addressed. First, since WiFi is a time division multiplex system (TDD), the transmitting and receiving functions use the same channel.

In order to provide continuous coverage throughout a sector, the coverage of adjacent beams of a multi-beam antenna overlap. This presents a potential for interference when adjacent beams illuminate the same area on the same frequency. Some solutions known in the art suggest using different channels for adjacent beams such that frequency selectivity reduces the interference from one subsector beam to another with the same frequency being used on alternate beams, designed so as to achieve a high level of isolation between co-located antennas that operate on the same radio channel. Embodiments of the present invention described herein may enables simultaneous co-location operation in the presence of some residual signal leakage between antennas.

MBAP are designed with directive antennas such that the same radio channel can be used simultaneously on different directional beams from the same physical location. With proper antenna beam control, UE located on different directions from the MBAP can simultaneously receive transmissions, provided that the related 802.11 protocol(s) allows transmission. The 802.11 protocol(s) provide for each AP to determine if the offered radio channel is clear using the 802.11 Clear Channel Assessment (CCA) before transmission. The CCA uses a combination of Energy Detection and Preamble Detection, where the Preamble Detection initiates a complex sequence of events (duration counter, NAV counter, Back-Off procedures) that inhibit transmissions.

The CCA is designed to trigger at very low signal levels and although MBAP antennas are designed to achieve a very high level (nominally 100 dB) of isolation between adjacent beams, this level of isolation is sufficient to prevent an adjacent MBAP APs transmission from triggering the Energy Detection portion of the CCA, but it is not sufficient to prevent the preamble from other beams from being detected.

Embodiments of the present invention provide a method in which the sensitivity of the receiving channel is reduced for a portion of the preamble portion of the transmission so that the CCA function is not activated. There are may be minor potential secondary effects of this sensitivity reduction. These effects are examined in the detailed description as set forth below.

BRIEF DESCRIPTION OF THE DRAWINGS

For a better understanding of the invention, and in order to show how it may be implemented, references are made, purely by way of example, to the accompanying drawings in which like numerals designate corresponding elements or sections. In the accompanying drawings: please review the ascribed selected activities in data transmission.

FIG. 7 is a table illustrating the associated effects of the various combinations of how two beams interact according to some embodiments of the present invention.

Figure 1:
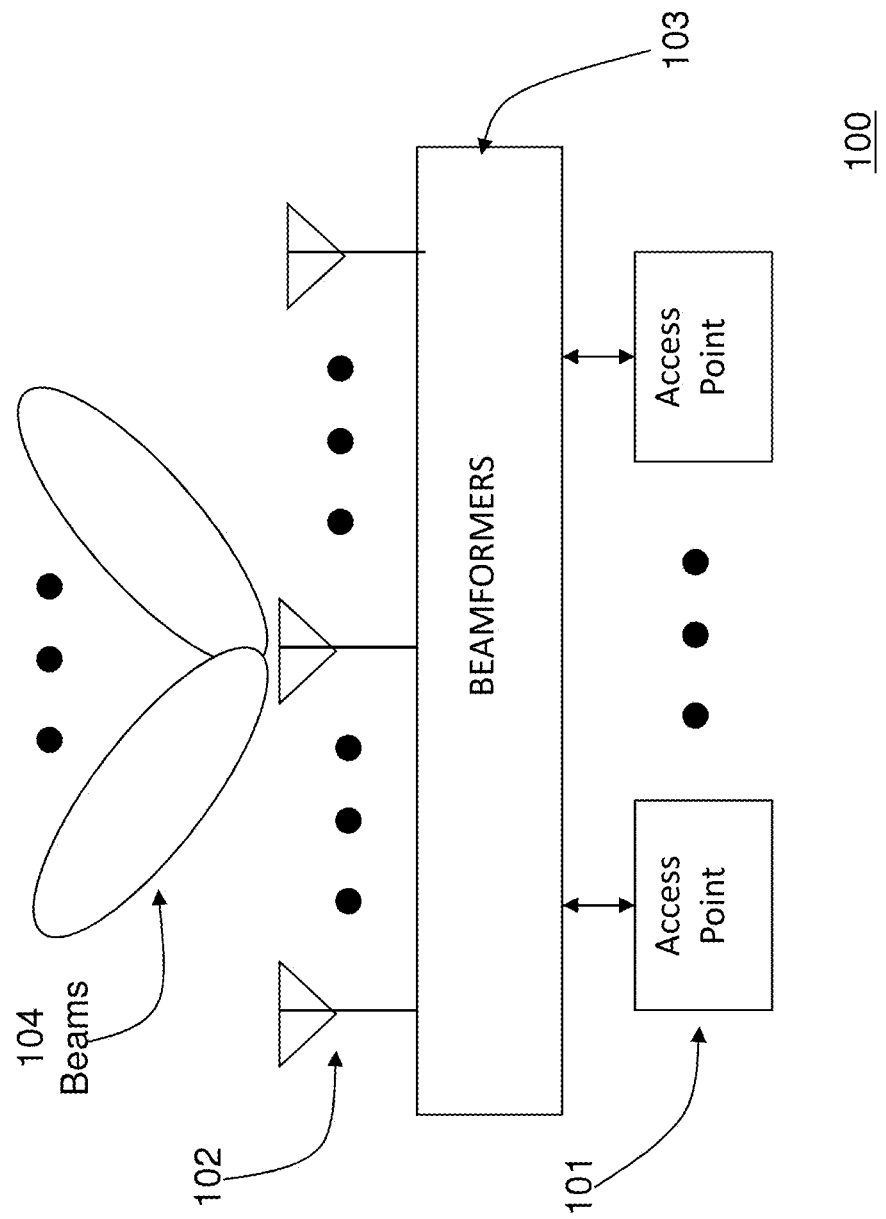
FIG. 1 is a block diagram illustrating an exemplary MBAP (Multi-Beam Access Point) system according to some embodiments of the present invention.

The drawings together with the following detailed description are designed make the embodiments of the invention apparent to those skilled in the art.

DETAILED DESCRIPTION

It is stressed that the particulars shown are for the purpose of example and solely for discussing the preferred embodiments of the present invention, and are presented in the cause of providing what is believed to be the most useful and readily understood description of the principles and conceptual aspects of the invention. In this regard, no attempt is made to show structural details of the invention in more detail than is necessary for a fundamental understanding of the invention. The description taken with the drawings makes apparent to those skilled in the art how the several forms of the invention may be embodied in practice.

Before explaining the embodiments of the invention in detail, it is to be understood that the invention is not limited in its application to the details of construction and the arrangement of the components set forth in the following descriptions or illustrated in the drawings. The invention is applicable to other embodiments and may be practiced or carried out in various ways. Also, it is to be understood that the phraseology and terminology employed herein is for the purpose of description and should not be regarded as limiting. In the description that follows, the interaction of two APs and antenna beams is described in detail. The use of two APs and beams is simply to reduce the complexity of the description and associated Figures. Embodiments of the present invention are applicable to an MBAP with N beams and M arrays, where the arrays are physically stacked so as to produce uncorrelated antennas as required for MIMO systems.

FIG. 1 is a block diagram of an embodiment of the invention illustrating how a number of access points 101 may direct a beamformer 103 and antenna array 102 to create a number of beams 104, to form a multi-beam access point system using phased array technology.

Figure 2:
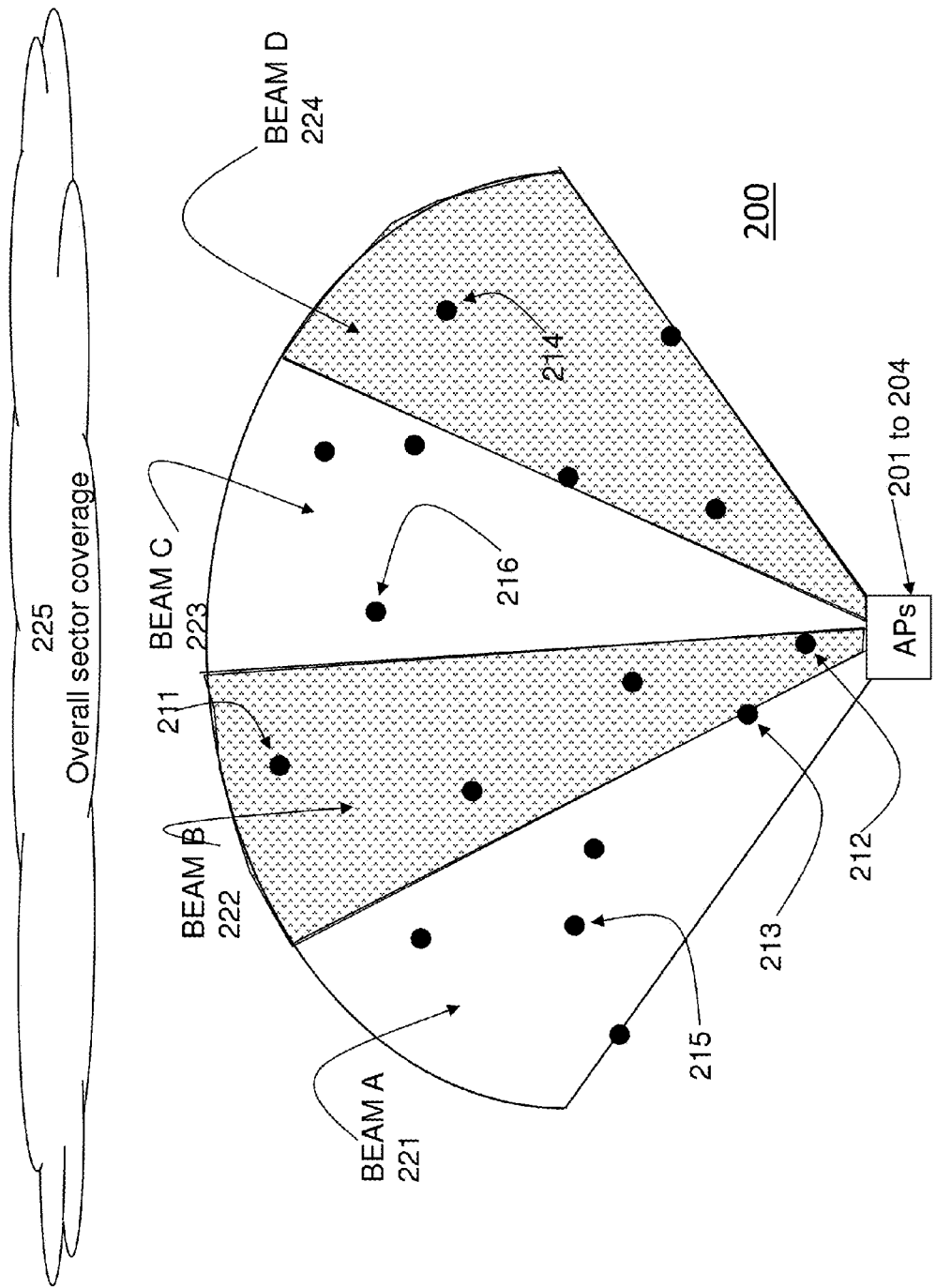
FIG. 2 is a block diagram illustrating an exemplary sector coverage further divided into four subsectors by the multi-beam access point system of FIG. 1 according to some embodiments of the present invention.

FIG. 2 is a block diagram 200 of an embodiment of the invention illustrating an overall sector coverage 225 subdivided into four subsectors 221-224 (beams A-D respectively) to provide communications for access points 201-204 to the UEs 211-216.

Figure 3:
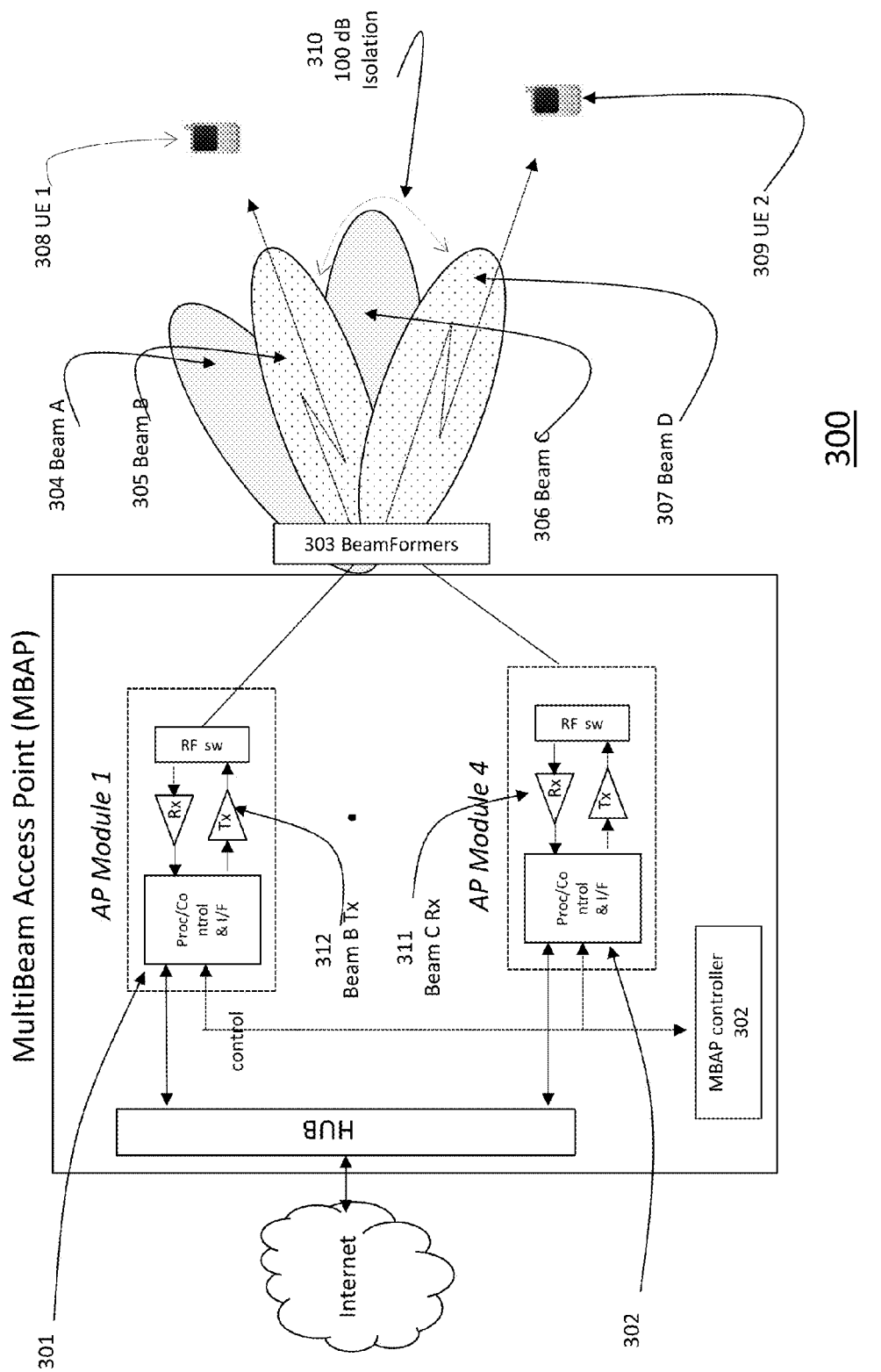
FIG. 3 is a block diagram illustrating an exemplary four beam MBAP showing two co-channel beams according to some embodiments of the present invention.

FIG. 3 is a block diagram illustrating an exemplary implementation of four (4) AP modules 301 to 302 (only two APs are shown for simplicity) that may be integrated within a MBAP configuration, according to embodiments of the present invention. The AP modules may supply signals to beamformer 303, which creates multiple directive antenna beams as follows: beam "A" 304, beam "B" 305, beam "C" 306; and beam "D" 307. Beams A 304 and C 306 operate on one channel and Beams B 305 and D 307 operate on another, non-overlapping channel, as noted by their two types of shading. In the figure, Beam "B" 305 is shown communicating to UE1 308 while Beam "D" is shown communicating to UE2 309. Beams "B" and "D" suggest descriptive depictions that may offer more controlled side lobes. As a result, beams "B and "D" can afford transmission paths that may be offered to and from their respective UEs which may occur simultaneously on both beams, which at the same time, may occur without mutual interference. Isolation between the antennas 310 supplies the nominally required 100 dBs of isolation.

The 802.11 standards require APs to continually monitor the radio channel to determine if the channel is occupied and when it is determined to be occupied to refrain from using the channel for a determined period.

Figure 4:
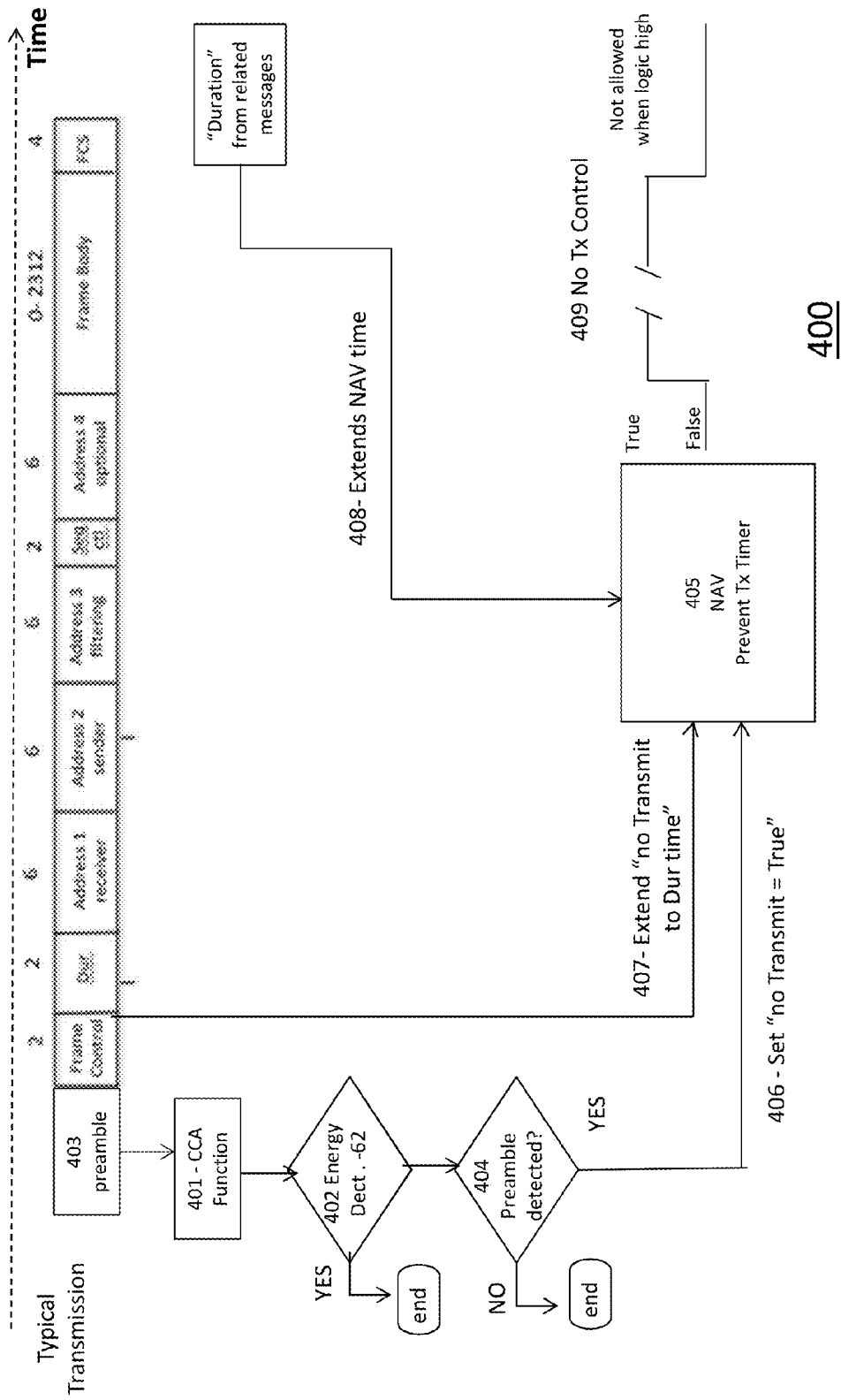
FIG. 4 is a high level exemplary flowchart illustrating the CCA function as defined by the 801.11 protocol according to some embodiments of the present invention.

FIG. 4 shows a flowchart diagram 400 illustrating a method according to embodiments of the present invention. The procedure starts with the Clear Channel Assessment (CCA) 401 function, which may have two parts. The first portion is directed to the Energy Detection (ED) 402 function which looks for any energy signal greater than −62 dBm in the 20 MHz primary channel. If a strong signal is detected, transmission is prohibited until the signal ceases. As discussed herein, the requirement for a minimum of −100 dBm of isolation is derived from this −62 dBm requirement. Other specific thresholds may be used.

ED thresholds are, at a minimum, −62 dBm for 20 MHz, −59 dBm for 40 MHz, and −56 for 80 MHz. Other specific thresholds may be used. Applying a +22 dBm as the power expressed in the antenna structure, and assuming a cluster with 4 beams on the same frequency, a minimum of −100 dB of isolation can be obtained in a 6.3 positive margin against the worst case (−62 dBm) ED threshold. Example isolation constraints are illustrated in Table (1) below:

TABLE (1)

| | | |
|---|---|---|
| Typical Pwr at Tx a | +22 dBm | Typical power at transmitter antenna |
| Max allowed Pwr at Rx | −62 dBm | Min signal to trigger Energy Detection |
| With 3 Beams active | +4.7 dB | 10 * log(3) |
| Min isolation | 88.7 dB | Isolation required |
| Design goal | 100 dB | |
| Margin | 11.3 dB | |

It should be noted that a 4 beam, 4 stream MIMO array will have 16 beams, 12 of which can operate at the same time which will produce an additional interference factor of 10.8 dB. Substituting 10.8 dB for a 4.7 dB margin in the above equation, this will produce a minimum isolation requirement of 94.8 dB, so with 100 dB, a margin of 5.2 is still achieved.

The second part of the CCA is preamble detection (e.g., preamble transmission detection). The preamble 403 is the leading part of all data transmissions. The typical transmission may include for example: frame control, Duration, Address receiver, Address 2 sender, Address 3 filtering, Sequence control, Address 4 optional, and frame body being the data itself. The receiver may synchronize with the data stream and attempts to detect the message preamble 404. If a preamble is detected, the Prevent Tx timer 405 is started 406 (e.g., by setting 'no transmit=True") and is initialized to last as long as the "duration" 407 value contained in the header (e.g., by extending "no Transmit to Dur time"). In addition, based on the specific type of data being exchanged, this timer may be updated to an ever longer value based on the NAV counter that is detected in related transmission 408 (e.g., by extending Nav time). A full discussion of this function can be found in the 801.11 standards. However, germane to embodiments of the present invention, is that the AP transmitter is prohibited from attempting to transmit as seen on the "No-Tx" control line 409 until the NAV ("Prevent Tx") timer 405 has expired and the "No-Tx" control line 409 has been de-asserted.

However the key part of embodiments of the present invention is developing a method that prevents the preamble from being detected as preventing that from occurring will prevent the NAV ("Prevent Tx") timer 405 from being initialized. The criterion for preventing the preamble is to prevent synchronization to the unique codes. There is redundancy in the preamble therefore it is predicted that in one embodiment disrupting 50% of the preamble transmission is sufficient to prevent it from being identified as a preamble.

As discussed herein, the isolation factor of −100 dBm between the transmitter antenna, as may be present in Beam B, and the receiver antenna, as may be present in Beam D, is sufficient to prevent the Energy Detection portion of the CCA from triggering. However, because the receiver associated with Beam D is established to detect preamble levels down to at least −92 dBm, the receiver will easily detect and decode said Beam B transmission. As noted in the table below, with 100 db of isolation and a +30 dBm transmitter power level, the preamble will present +14 db Signal to Interference plus Noise Ratio (SINR) and will thusly be readily detectable. Example isolation considerations are illustrated in Table (2) below:

TABLE (2)

| | | |
|---|---|---|
| Typical Pwr at Tx array | +22 dBm | Power at array - typically lower |
| Isolation | −100 dB | |
| Signal power | −78 dBm | |
| Detection level | −92 dBm | |
| SINR | 14 dB | |

The 802.11 protocols require that when a preamble is detected, that the detecting AP refrain from transmitting until the detecting AP's "No-Transmit" control line is un-asserted. In the case of the MBAP, this offers a means by which any AP may transmit (using Beam B 305 for example) an associated AP (using Beam D 307 for example) and previously blocked, from transmitting if the preamble is detected. As described, the preamble will be most likely detected. However, where this blocking is present and detected, the AP on Beam D may offer to transmit to UE 2 309 without any adverse impact on AP using Beam B transmitting to UE1 308.

Embodiments of the present invention may implement a reduction of sensitivity of the receive system long enough and to a low enough level to prevent the preamble from being detected.

Figure 5:
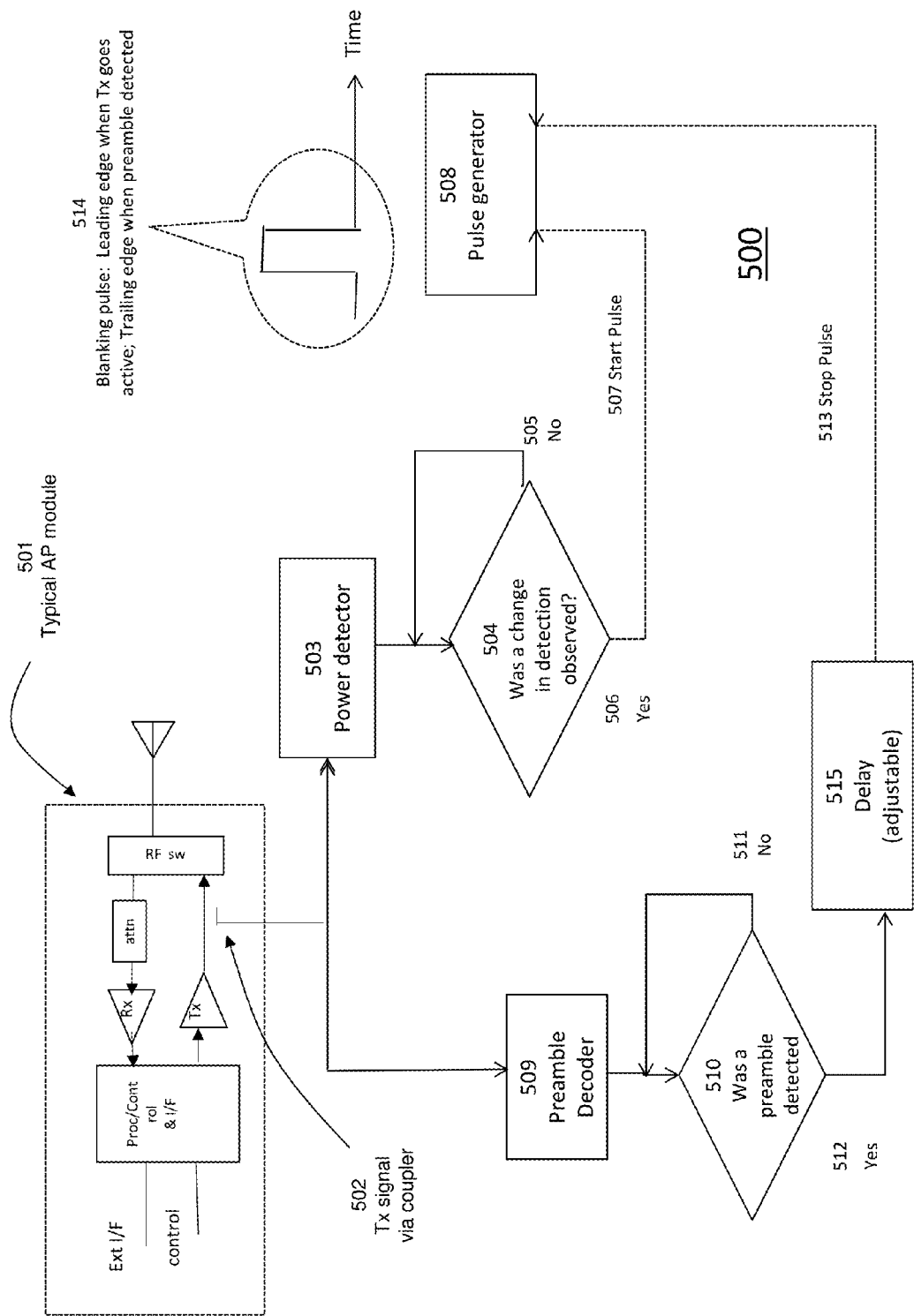
FIG. 5 is a high level exemplary flowchart illustrating the Preamble detection and blanking pulse function according to some embodiments of the present invention.

FIG. 5 shows an exemplary flowchart 500 illustrating embodiments of a method of generating a blanking pulse 514 that is used to de-sensitize the receivers in co-located APs. Shown in block 501 is a typical AP. A coupler probe is installed in the transmitter output line 502 and the signal from the transmitter is sent to both a power detector 503 and a preamble decoder 509. The state of the power detector is determined in logic block 504. If and only if a change is detected 506 (indicating the transmitter has become active) will a Start Pulse 507 be sent to the pulse generator 508. Otherwise, in operation 505, the start pulse is not sent.

The transmitter output may be also sent to the preamble detector 509. Since all 502 transmissions are preceded by the preamble and since the signal being sent to preamble detector is a strong signal, the preamble will be decoded. As soon as the decoding is completed, plus an adjustable delay 515 of several μsec, a Stop Pulse 513 signal is sent to the pulse generator 508. In this manner a blanking pulse 514 is generated where the leading edge is coincident with the transmitter starting and the trailing edge is coincident, with an adjustable delay 515 coincident with the detection by 509 of the preamble. The adjustable delay is set to assure that the blanking pulse 514 is long enough to reliably prevent the receiver in the associated AP from detecting the preamble. The 802.11 preamble has redundancy and while the complete preamble does not have to be blocked, a substantial portion, based on the specific 802.11 protocol being used, must be blocked. This delay, which is adjustable based on the protocol being detected, assures adequate blocking.

Figure 6:
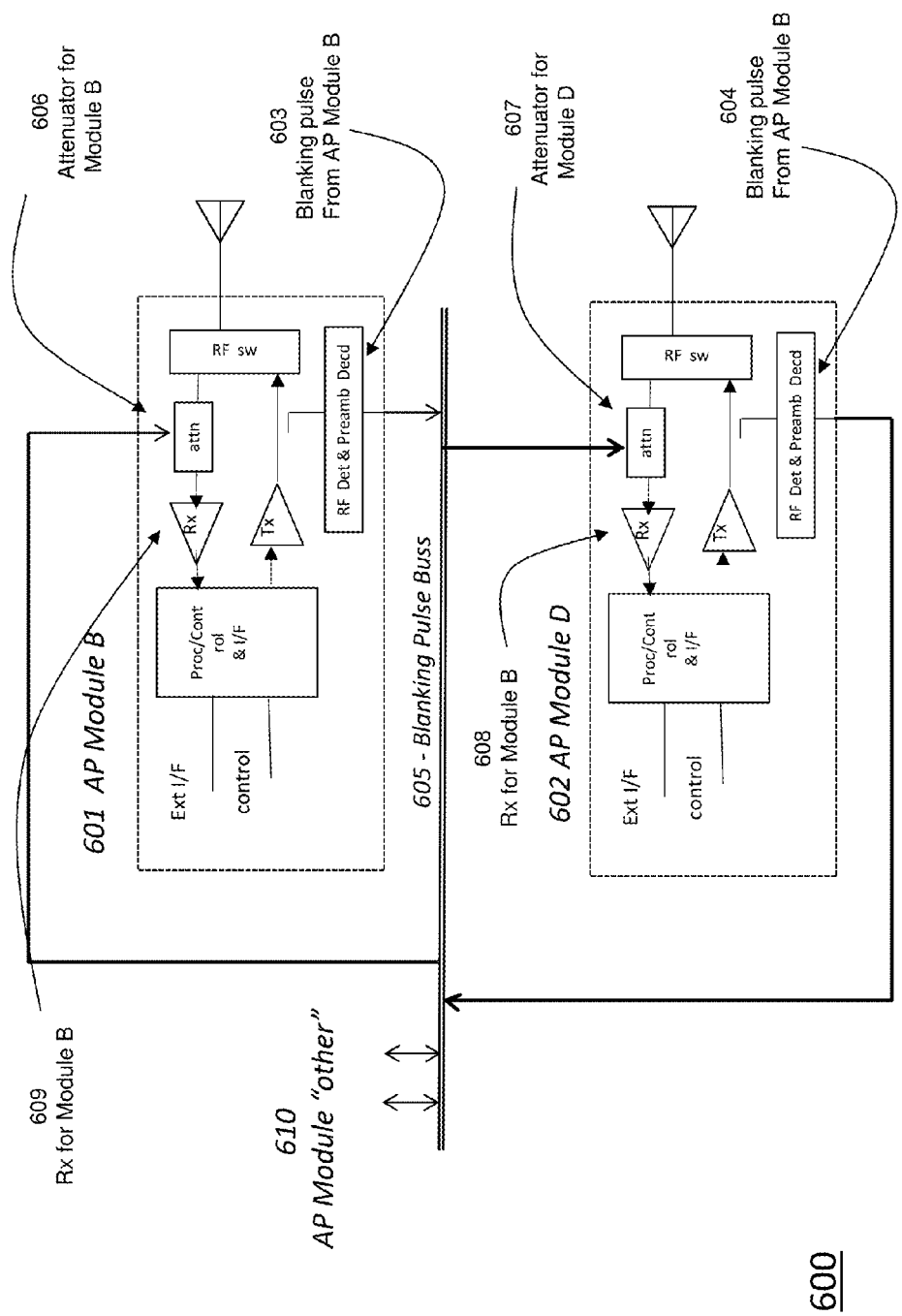
FIG. 6 is a block diagram illustrating an exemplary integration of the blanking pulse function into the MBAP according to some embodiments of the present invention.

FIG. 6 shows an exemplary block diagram 600 illustrating embodiments of the method by which the blanking pulse 514 is used to de-sensitize the receivers in the co-located AP. FIG. 6 shows two AP modules, one AP 601 representing Beam B 305 and another AP 602 representing Beam D 307. In the discussion that follows, it is assumed that Beam D is transmitting the detection of the preamble from Beam D by Beam B will prevent Beam B from transmitting. Embodiments of the present invention are designed so that Beam B can transmit in the presence of Beam D transmitting.

AP module D 602 has a Blanking pulse generator 604 as described in FIG. 5 which is connected to the Blanking Pulse Buss 605 so that the Blanking Pulse that is generated coincident with AP Module D 602 generating a preamble at the start of its transmission is an input to attenuator 606 in front of the receiver 609 in AP module B 601. The attenuator may reduce or attenuate the signal level into the AP Module B 601 receiver 609 for example for the duration of the preamble, preventing the CCA function in AP Module B from activating.

In a similar manner, the Blanking Pulse Generator 603 from AP module on B has its output input to the Blanking Pulse Bus 605 and if there are other co-located (e.g., positioned on a same printed circuit board (PCB) or packed within same housing), co-channel (i.e., operating on same frequency band) AP suggested by element 610, their Blanking Pulse Generator outputs would also be added to the Blanking Pulse Buss and will attenuate all the other receivers. It will be noted that the Blanking Pulse generated by a specific AP's transmitter will also attenuate the receiver associated with that specific AP; however since a specific 802.11 AP does not receive and transmit at the same time, this de-sensitization has no affect.

The amount of attenuation that is applied is directly related to the residual transmitter to receiver leakage. As discussed, the isolation factor of for example –100 dBm between the transmitter antenna, as may be present in Beam D, and the receiver antenna, as may be present in Beam B, is sufficient to prevent the Energy Detection portion of the CCA from triggering. However, because the receiver associated with Beam B is established to detect preamble levels down to at least –92 dBm, the receiver will easily detect and decode said Beam D transmission. As noted in the table below, with 100 dB of isolation and a +30 dBm transmitter power level, the preamble will present +14 dB SINR and will thusly be readily detectable. Example power levels required for detection are illustrated in Table (3) below (other power levels may be used):

TABLE (3)

| | | | |
|---|---|---|---|
| Power at array - typically lower | dBm | +22 | Typical Pwr at Tx array |
| | dB | –100 | Isolation |
| | dBm | –78 | Signal power |
| | dBm | –92 | Detection level |
| | dB | 14 | SINR |
| MDS (Minimum Decodable Signal) | dB | 8 | Detection level |
| SINR - Detection level = 14 – 8 = 6 | dB | 6 | Minimum Attenuation required |
| | dB | 3 | Margin |
| This value will be field adjustable | dB | 9 | Applied Attenuation |

The adverse impact of this 9 dB attenuation on the receiver is based on (a) the specific mode of the AP at the instant of attenuation and (b) the duration of the attenuation.

According to some embodiments of the present invention, the attenuation of the received signal may be carried out only when the AP transmitting the preamble and the AP receiving the preamble are co-channel.

According to some embodiments of the present invention, the attenuation of the received signal is carried out after being received by an antenna of the receiving AP and prior to entering a receiver of said receiving AP.

According to some embodiments of the present invention, attenuators 606 or 607 or both may include a blanking pulse generator configured to generate a blanking pulse having amplitude selected such that it desensitizes at least one receiver in at least one of the co-located APs throughout duration of the preamble as detected by the preamble detection unit.

According to some embodiments of the present invention, the system may be a Multi-Beam Access Point (MBAP) system having Clear Channel Assessment (CCA) functionality, and wherein said attenuation is configured to suppress an activation of the CCA functionality caused by a leakage introduced by co-located AP transmitters.

According to some embodiments of the present invention attenuators 606 or 607 or both may be configured to apply a variable amount of attenuation which is proportional to a measured residual transmitter to receiver signal leakage.

FIG. 7 summarizes the various interaction modes in a form of a table 700 according to one embodiment. In line 701, Beam B is transmitting and in this case there is no damage to Beam B by introducing 9 dB of attenuation to its receiver. In line 702, Beam B is monitoring the environment, looking for possible UEs. A weak UE (e.g., one that is just at system threshold) will not be detected for the duration of the attenuation. However, if the UE has a SINR above 17 dBm, even with an attenuation of 9dB, the UE will have an 8 dB SINR and will be detected.

Line 703 describes the operation in the 5 GHz band where all AP use OFDM. In this situation Beam B is receiving an OFDM signal and Beam D is transmitting and OFDM preamble. The total preamble is 16 μsec, but if the first 8 μsec are blanked, it may not be decoded by Beam B. Consequently 2 of the OFDM symbols received by Beam B may be decreased by 9 dB. This 9 dB of decreased receiver sensitivity may increase the OFDM symbol errors and consequently the BER (Bit Error Rate) of the encoded data. The 802.11 OFDM uses a family of convolution encoding which have Forward Error Correction (FEC) which may reduce the adverse impact of this increased BER. The ability of FEC to recover the data is directly related to the SINR and the convolution encoding rate being used by the UE. If the UE's SINR is 26 dB or greater, the 9 dB decreased sensitivity may reduce the SINR to 17 which may have minimal impact on 64 QAM and lower modulations.

Lines 704, 705, and 706 show the impact when one or more beams are using direct-sequence spread spectrum (DSSS), which is possible in the 2.4 GHz band. In all cases, the de-sensitization of Beam D receiver during the Beam D preamble transmission may have a more negative impact than when only OFDM is used by both parties. This is due to the DSSS preamble being substantially longer than the OFDM preamble and /or related to DSSS not having FEC. Based on this factor, embodiments of the invention described herein may have the most benefit where DSSS is not active.

Embodiments of the present invention will allow co-located APs to transmit at the same time by suppressing the detection of preambles from co-located transmitters. When those co-located transmitters operate, there may be a decrease in the SINR of the co-located receivers. This is noted in column 707 of FIG. 7. When Beam D is transmitting, Beam B is estimated to see a 6 dB increase in noise based on leakage from the transmitted signal.

The attenuation value for attenuators 606 and 607 in FIG. 6 is adjusted based on the amount of leakage between antennas after installation. In addition the amount of delay 515 in FIG. 5 is adjusted based on both protocol used and the amount of isolation. In both cases these adjustments are made so as to obtain reliable cancellation of preambles generated by co-located AP while minimizing the amount of adverse impact experienced by the associated receivers.

Figure 8:
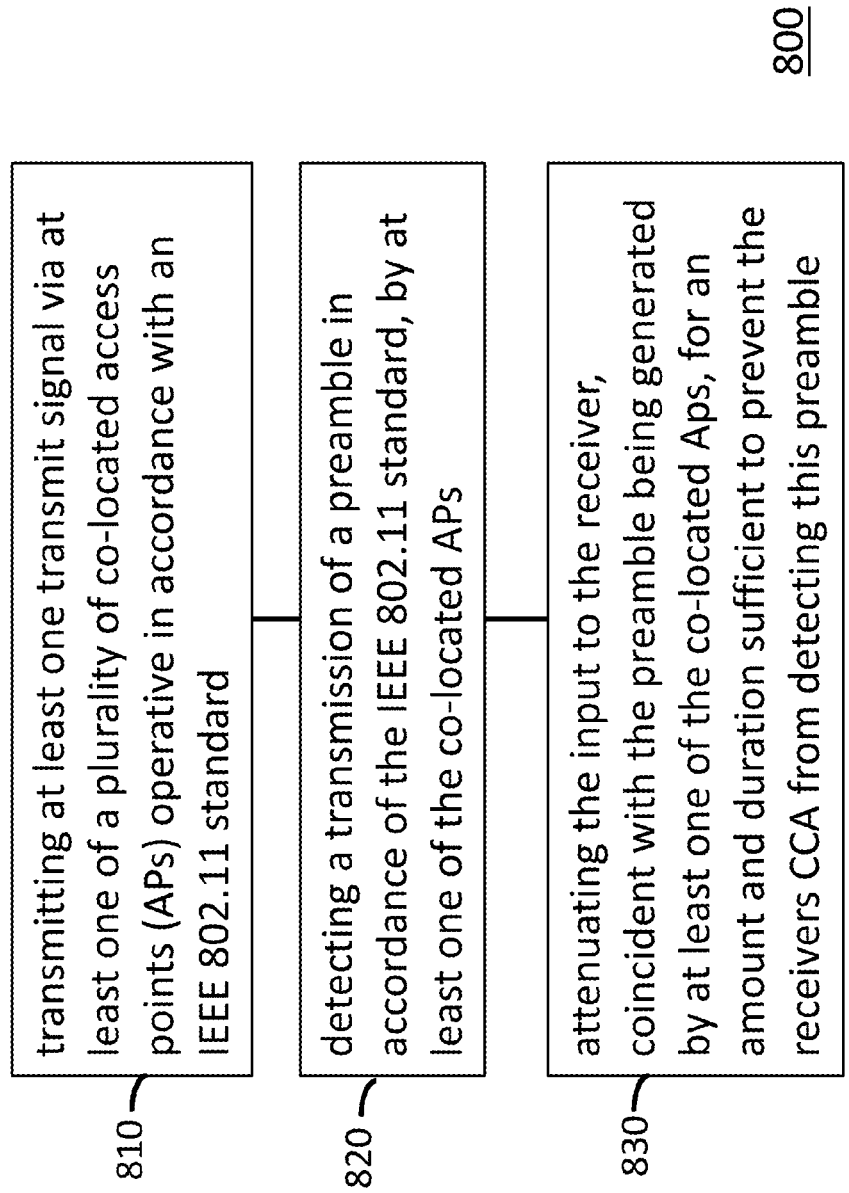
FIG. 8 is a high level flowchart illustrating a method which summarizes the broadest scope in accordance with embodiments of the present invention.

FIG. 8 is a high level flowchart illustrating a method 800 in accordance with embodiments of the present invention. Method 800 may include for example transmitting at least one transmit signal via at least one of a plurality of co-located access points (APs) operative in accordance with an IEEE 802.11 standard 810; detecting a transmission of a preamble in accordance of the IEEE 802.11 standard, by at least one of the co-located APs 820; and attenuating a signal received by at least one of the plurality of co-located APs upon detection of the preamble by the preamble detection unit 830.

The figures that have been described above supply details how the transmitting and receiving apparatus(es) supporting two co-located AP interact with each other. As will be appreciated by one skilled in the art, these same techniques can be readily expanded when there are available multiple APs that may operate on the same channel, as may be present in the same MBAP.

As will be appreciated by one skilled in the art, aspects of the present invention may be embodied as a system, method or an apparatus. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "processor", "computer readable medium", "circuit", "module" or "system."

The flowchart and block diagrams herein illustrate the architecture, functionality, and operation of possible implementations of systems and methods according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

Embodiments of the invention may include an article such as a computer or processor readable non-transitory storage medium, such as for example a memory, a disk drive, or a USB flash memory device encoding, including or storing instructions, e.g., computer-executable instructions, which when executed by a processor or controller, cause the processor or controller to carry out methods disclosed herein.

In the above description, an embodiment is an example or implementation of the inventions. The various appearances of "one embodiment," "an embodiment" or "some embodiments" do not necessarily all refer to the same embodiments.

Although various features of the invention may be described in the context of a single embodiment, the features may also be provided separately or in any suitable combination. Conversely, although the invention may be described herein in the context of separate embodiments for clarity, the invention may also be implemented in a single embodiment.

Reference in the specification to "some embodiments", "an embodiment", "one embodiment" or "other embodiments" means that a particular feature, structure, or characteristic described in connection with the embodiments is included in at least some embodiments, but not necessarily all embodiments, of the inventions.

It is to be understood that the phraseology and terminology employed herein is not to be construed as limiting and are for descriptive purpose only.

The principles and uses of the teachings of the present invention may be better understood with reference to the accompanying description, figures and examples.

It is to be understood that the details set forth herein do not construe a limitation to an application of the invention.

Furthermore, it is to be understood that the invention can be carried out or practiced in various ways and that the invention can be implemented in embodiments other than the ones outlined in the description above.

It is to be understood that the terms "including", "comprising", "consisting" and grammatical variants thereof do not preclude the addition of one or more components, features, steps, or integers or groups thereof and that the terms are to be construed as specifying components, features, steps or integers.

If the specification or claims refer to "an additional" element, that does not preclude there being more than one of the additional element.

It is to be understood that where the claims or specification refer to "a" or "an" element, such reference is not be construed that there is only one of that element.

It is to be understood that where the specification states that a component, feature, structure, or characteristic "may", "might", "can" or "could" be included, that particular component, feature, structure, or characteristic is not required to be included.

Where applicable, although state diagrams, flow diagrams or both may be used to describe embodiments, the invention is not limited to those diagrams or to the corresponding descriptions. For example, flow need not move through each illustrated box or state, or in exactly the same order as illustrated and described.

Methods of the present invention may be implemented by performing or completing manually, automatically, or a combination thereof, selected steps or tasks.

The term "method" may refer to manners, means, techniques and procedures for accomplishing a given task including, but not limited to, those manners, means, techniques and procedures either known to, or readily developed from known manners, means, techniques and procedures by practitioners of the art to which the invention belongs.

The descriptions, examples, methods and materials presented in the claims and the specification are not to be construed as limiting but rather as illustrative only.

Meanings of technical and scientific terms used herein are to be commonly understood as by one of ordinary skill in the art to which the invention belongs, unless otherwise defined.

The present invention may be implemented in the testing or practice with methods and materials equivalent or similar to those described herein.

While the invention has been described with respect to a limited number of embodiments, these should not be construed as limitations on the scope of the invention, but rather as exemplifications of some of the preferred embodiments. Other possible variations, modifications, and applications are also within the scope of the invention. Accordingly, the scope of the invention should not be limited by what has thus far been described, but by the appended claims and their legal equivalents.

The invention claimed is:

1. A system comprising:
   a plurality of co-located access points (APs) operative in accordance with an IEEE 802.11 standard;
   a plurality of preamble detection units associated with the respective plurality of co-located APs, each preamble detection unit configured to detect a transmission of a preamble in accordance of the IEEE 802.11 standard, by at least one of the other co-located APs;
   a plurality of attenuators associated with the respective plurality of co-located APs, each attenuator configured to attenuate a signal received by its associated AP upon detection by the preamble detection unit of a preamble transmitted by another of the co-located APs; and
   at least one blanking pulse generator configured to generate a blanking pulse having an amplitude selected such that it desensitizes at least one receiver in at least one of the co-located APs throughout a duration of the preamble as detected by the preamble detection unit.

2. The system according to claim 1, wherein the attenuation of the received signal is carried out only when the AP transmitting the preamble and the AP receiving the preamble are co-channel.

3. The system according to claim 1, wherein the attenuation of the received signal is carried out after being received by an antenna of the receiving AP and prior to entering a receiver of said receiving AP.

4. The system according to claim 1, wherein the at least one attenuator comprises said blanking pulse generator.

5. The system according to claim 1, wherein the system is a Multi-Beam Access Point (MBAP) system having Clear Channel Assessment (CCA) functionality, and wherein said attenuation is configured to suppress an activation of the CCA functionality caused by a leakage introduced by co-located AP transmitters.

6. The system according to claim 4, wherein the attenuator is configured to apply a variable amount of attenuation which is proportional to a measured residual transmitter to receiver signal leakage.

7. A method comprising:
   transmitting at least one transmit signal via at least one of a plurality of co-located access points (APs) operative in accordance with an IEEE 802.11 standard;
   detecting transmission of a preamble in accordance of the IEEE 802.11 standard, by at least one of the APs co-located with the transmitting AP; and
   attenuating a signal received by at least one of the non-transmitting plurality of co-located APs upon said detection of transmission of the preamble by the transmitting AP, wherein the attenuation is achieved by generating a blanking pulse having an amplitude selected such that it desensitizes at least one receiver in at least one of the co-located APs throughout a duration of the preamble as detected by the preamble detection unit.

8. The method according to claim 7, wherein the attenuation of the received signal is carried out only whenever the AP transmitting the preamble and the AP receiving the preamble are co-channel.

9. The method according to claim 7, wherein the attenuation of the received signal is carried out after being received by an antenna of the receiving AP and prior to entering a receiver of said receiving AP.

10. The method according to claim 7, wherein the method is operable at a Multi-Beam Access Point (MBAP) system having Clear Channel Assessment (CCA) functionality, and wherein said attenuation is configured to suppress an activation of the CCA functionality caused by a leakage introduced by co-located AP transmitters.

11. The method according to claim 10, wherein the attenuation comprises a variable amount of attenuation which is proportional to a measured residual transmitter to receiver signal leakage.

12. A non-transitory computer readable storage medium product having stored thereon instructions which when executed cause a processor to:
   control transmission of at least one transmit signal via at least one of a plurality of co-located access points (APs) operative in accordance with an IEEE 802.11 standard;
   detect transmission of a preamble in accordance of the IEEE 802.11 standard, by at least one of the APs co-located with the transmitting AP; and
   cause attenuation of a signal received by at least one of the non-transmitting plurality of co-located APs upon said detection of transmission of the preamble by the transmitting AP, wherein the attenuation is achieved by generating a blanking pulse having an amplitude selected such that it desensitizes at least one receiver in at least one of the co-located APs throughout a duration of the preamble as detected by the preamble detection unit.

13. The non-transitory computer readable storage medium according to claim 12, wherein the attenuation of the received signal is carried out after being received by an antenna of the receiving AP and prior to entering a receiver of said receiving AP.

14. The non-transitory computer readable storage medium according to claim 12, wherein the computer program product is operable at a Multi-Beam Access Point (MBAP) system having Clear Channel Assessment (CCA) functionality, and wherein said attenuation is configured to suppress an activation of the CCA functionality caused by a leakage introduced by co-located AP transmitters.

15. The non-transitory computer readable storage medium according to claim 14, wherein the attenuation comprises a variable amount of attenuation which is proportional to a measured residual transmitter to receiver signal leakage.

16. The non-transitory computer readable storage medium according to claim 12, wherein the attenuation of the received signal is carried out only whenever the AP transmitting the preamble and the AP receiving the preamble are co-channel.

* * * * *